July 6, 1948.  K. L. SCOTT  2,444,751
METHOD AND APPARATUS FOR SORTING MAGNETIC
MATERIALS ACCORDING TO THEIR
RESIDUAL MAGNETISM
Filed Feb. 12, 1946
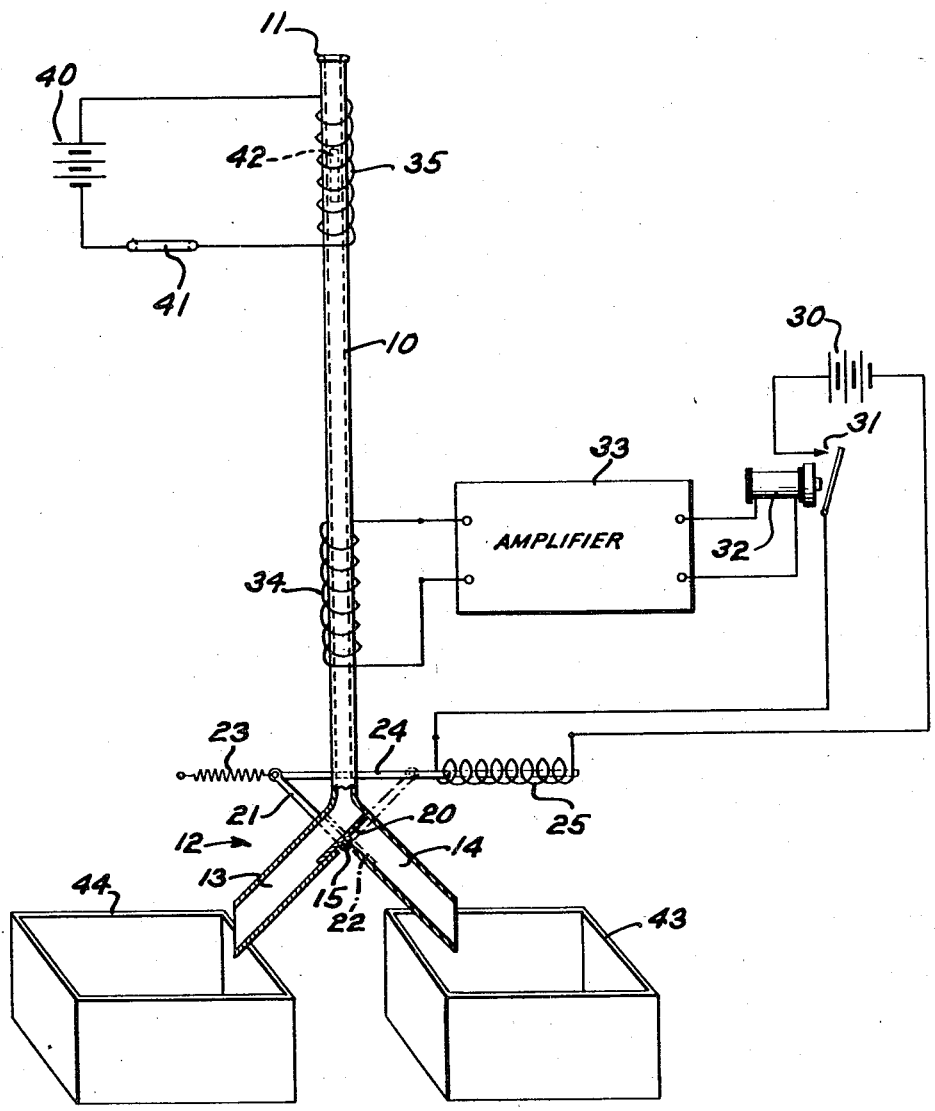
INVENTOR
K. L. SCOTT
BY E. F. Kane
ATTORNEY

UNITED STATES PATENT OFFICE 2,444,751

METHOD AND APPARATUS FOR SORTING MAGNETIC MATERIALS ACCORDING TO THEIR RESIDUAL MAGNETISM

Kenneth L. Scott, Western Springs, Ill., assignor to Western Electric Company, Incorporated, New York, N. Y., a corporation of New York Application February 12, 1946, Serial No. 647,149

7 Claims. (Cl. 209—72)

This invention relates to an apparatus for and method of making magnetic measurements and more particularly to a method of and apparatus for determining residual magnetism.

It is an object of this invention to provide a new and efficient method of and apparatus for determining residual magnetism.

In accordance with one embodiment of this invention a ferromagnetic bar of the type used for permanent magnets is first subjected to and held by a relatively strong magnetizing force within a current carrying coil. The circuit to the coil is broken permitting the bar to drop from the coil under the influence of the force of gravity. In its descent, the bar drops through a detecting coil connected to an amplifier and if the bar has retained a desired amount of residual magnetism, a voltage impulse is generated in the second coil as the bar drops through it. The amplified voltage impulse operates a relay connected in a solenoid circuit which operates a gate to separate the bars according to their residual magnetic content.

A complete understanding of the invention may be had by reference to the accompanying drawing wherein the single figure is illustrative of one embodiment of the invention.

As shown in the drawing, a tube 10 made of non-magnetic material is provided with an opening 11 at its upper end and a Y-shaped fork 12 at its lower end which comprises branch passages 13 and 14. At the confluence of the passages 13, 14 and the tube 10, a double-ended selecting gate 20 is fixed at its center to a pivoted shaft 15 so that it may be rocked by a lever 21 from its normal position as shown in solid lines in the drawing to a second selecting position 22 as shown in dot and dash lines. In the normal position the gate 20 closes the upper end of the passage 14 from communication with the tube 10 and permits free passage from the tube 10 to branch 13, while in the rocked or second position the gate closes the passage 13 from communication with the tube 10 and opens the passage 14 to the tube 10. The gate 20 is held in the normal position by the tension of a spring 23 attached to the upper end of the lever 21 whose lower end is secured to the pivoted shaft 15.

The upper end of lever 21 is pivotally connected to a core member 24 of a solenoid 25 which when energized acts against the spring 23 to rock the gate 20. A source of current 30 may be connected to the solenoid 25 through the contacts 31 of a slow-to-release relay 32 the winding of which is connected to and may be operated by a predetermined output of an amplifier 33. The amplifier 33 is connected to a pick-up coil 34 which encircles the tube 10 near its lower end, and upon a current being generated in the coil 34 the amplifier will serve to energize relay 32.

A magnetizing coil 35 encircles the tube 10 near its upper end at a predetermined height above the pick-up coil 34 and is connected to a source of direct current 40 through a switch 41 which may be operated manually to open or close the circuit between the source of current and the coil.

A bar 42 of magnetic material which is to be tested for its desirability as a permanent magnet may be dropped into the tube 10 through the opening 11 after the circuit between the source of current 40 and the coil 35 has been closed to energize the coil 35 to provide a relatively strong magnetizing force sufficient to stop and hold the bar 42 in magnetic suspension and to magnetically saturate the bar. After a predetermined period of time the switch 41 is operated to open the circuit to the coil 35 thereby reducing the magnetic field of the coil to zero and releasing the bar 42 from magnetic suspension. Acting under the force of gravity, the bar 42 drops through the tube 10 passing through the space surrounded by the pickup coil 34. If the bar 42 has retained a predetermined amount of residual magnetism it will, as it passes the turns of the coil 34, cause to be generated in the coil an electromotive force which when amplified by the amplifier 33 will be sufficiently strong to energize and actuate the relay 32 closing the contacts 31 and permitting current to flow from the source 30 through the solenoid 25. The energized solenoid 25 thereupon attracts the plunger 24 to pull the lever 21 to the right and operate the gate 20 to the second selecting position. Due to the slow-to-release action of the relay 32 the gate 20 is held in the second position long enough to permit the bar to be directed through the branch passage 14 into a container 43.

If the bar 42 fails to retain the desired quantity of residual magnetism it will when passing the turns of the coil 34 fail to cause to be generated a sufficient amount of electromotive force to operate the relay 32 through the amplifier 33 and thus the gate 20 will remain in its normal position and thereby deflect the bar through the passage 13 into a container 44.

It is believed to be apparent that bars having a predetermined amount of residual magnetism will be directed into the container 43, whereas bars having less than the predetermined amount of residual magnetism will fall into the container 44, thereby effecting a separation of the desirable from the undesirable bars.

What is claimed is:

1. A method of sorting ferromagnetic bars in accordance with their magnetic characteristics comprising magnetically suspending a bar to be tested in a magnetic field to magnetically saturate said bar, removing said field to permit said bar to drop by the force of gravity through a coil thereby to cause an electromotive force to be generated in said coil, and utilizing said generated electromotive force to operate a separating device to classify said bar in accordance with the amount of residual magnetism therein.

2. A method of determining residual magnetism in permanent magnets comprising magnetically suspending a specimen magnet in a surrounding magnetic field to magnetically saturate said specimen, removing said magnetic field to permit said specimen to fall under the influence of the force of gravity through a coil thereby causing an electromotive force to be generated in said coil, and utilizing said electromotive force to operate a selecting device to classify said specimen in accordance with the amount of residual magnetism therein.

3. A method for determining the magnetic characteristics of permanent magnets comprising magnetically suspending a specimen magnet within a magnetic field at a predetermined height relative to a coil, magnetically saturating said specimen, removing said field to permit said specimen to drop with the aid of gravity along a path adjacent to the turns of said coil thereby causing an electromotive force to be generated in said coil, amplifying said electromotive force, and utilizing said amplified electromotive force to selectively classify said specimen in accordance with the quantity of residual magnetism therein.

4. An apparatus for determining magnetic characteristics of magnetic materials comprising an electrical switch, a magnetizing coil adapted to be connected through said switch to a source of electric current, a second coil in axial vertical alignment with said magnetizing coil but disposed at a predetermined lower level than said magnetizing coil, an amplifier connected to said second coil, and an electromechanical selecting means connected to said amplifier to selectively segregate said magnetic material in accordance with the amount of current generated in said second coil due to the passing of said magnetic material along a course adjacent to the turns of said second coil in a gravity induced fall from said magnetizing coil.

5. An apparatus for determining magnetic characteristics comprising means for producing a magnetic field to magnetically saturate and suspend a specimen to be tested in a predetermined position, means for deenergizing said magnetic field, electromotive force generating means responsive to magnetism disposed at a predetermined distance below said predetermined position, and classifying means to selectively segregate said specimen under test, said classifying means being connected to said electromotive force generating means.

6. A method of determining characteristics of magnets comprising magnetically suspending a magnet in a magnetic field, magnetically saturating said magnet, removing said magnetic field thereby permitting said magnet to drop with the aid of gravity through a coil to generate an electromotive force in the coil proportional to the residual magnetism in said magnet, and utilizing said electromotive force to selectively classify said magnet in accordance with the amount of residual magnetism therein.

7. A method for determining magnetic characteristics comprising suspending a specimen of magnetic material within a field of magnetizing force, removing said magnetizing force, dropping said specimen through a coil thereby to cause an electromotive force to be generated in said coil proportional to the amount of residual magnetism in said specimen, and utilizing said electromotive force to selectively direct the course of said specimen after it falls through said coil.

KENNETH L. SCOTT.

REFERENCES CITED

The following references are of record in the file of this patent:

UNITED STATES PATENTS

| Number | Name | Date |
| --- | --- | --- |
| Re. 21,927 | Brace | Oct. 21, 1941 |
| 1,973,414 | Miller | Sept. 11, 1934 |
| 2,045,769 | Geffcken | June 30, 1936 |